US012224499B2

(12) United States Patent
Ghosh et al.

(10) Patent No.: US 12,224,499 B2
(45) Date of Patent: Feb. 11, 2025

(54) WIDEBAND MICROSTRIP ANTENNA ARRAY BASED ANTENNA SYSTEM FOR GHz COMMUNICATIONS

(71) Applicant: THE INDIAN INSTITUTE OF TECHNOLOGY KHARAGPUR, West Bengal (IN)

(72) Inventors: Saswati Gopal Ghosh, West Bengal (IN); Debarati Sen, West Bengal (IN)

(73) Assignee: THE INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 136 days.

(21) Appl. No.: 18/152,674

(22) Filed: Jan. 10, 2023

(65) Prior Publication Data

US 2023/0361469 A1 Nov. 9, 2023

(30) Foreign Application Priority Data

May 4, 2022 (IN) ............................ 202231026020

(51) Int. Cl.

| | |
|---|---|
| ***H01Q 5/30*** | (2015.01) |
| ***H01Q 1/48*** | (2006.01) |
| ***H01Q 5/307*** | (2015.01) |
| ***H01Q 9/04*** | (2006.01) |
| ***H01Q 21/06*** | (2006.01) |
| ***H01Q 21/08*** | (2006.01) |

(52) U.S. Cl.

CPC ............... *H01Q 5/307* (2015.01); *H01Q 1/48* (2013.01); *H01Q 9/0457* (2013.01); *H01Q 21/065* (2013.01); *H01Q 21/08* (2013.01)

(58) Field of Classification Search

CPC .......... H01Q 1/48; H01Q 5/307; H01Q 5/342; H01Q 9/0414; H01Q 9/0457; H01Q 21/065; H01Q 21/08

See application file for complete search history.

(56) References Cited

U.S. PATENT DOCUMENTS

2020/0059011 A1* 2/2020 Sarabandi ............ H01Q 21/065

FOREIGN PATENT DOCUMENTS

| | | | |
|---|---|---|---|
| CN | 102299418 A * | 12/2011 | ............... H01Q 1/38 |
| CN | 110034382 A * | 7/2019 | ............... H01Q 1/32 |
| WO | WO-2021105961 A1 * | 6/2021 | ............. H01Q 1/422 |
| WO | WO-2022049951 A1 * | 3/2022 | ............. H01Q 21/08 |

* cited by examiner

*Primary Examiner* — Hoang V Nguyen

(74) *Attorney, Agent, or Firm* — MASOVALLEY & PARTNERS; Peter Martinez

(57) ABSTRACT

The present invention discloses a wide microstrip antenna array based antenna system for millimeter wave applications. The microstrip antenna array based antenna system of the present invention includes plurality of patch antennas and each of the patch antennas includes a U-slot of unequal arms. This patch antenna with the U-slot acts as the array element. The array elements are placed in a linear array at a distance of λ/2 from each other on the antenna substrate to achieve desired scan performance. The microstrip corporate feed network with T-junction power divider is used. The antenna elements are fed by electromagnetic coupling with the feed network. The antenna array with dummy elements on both sides of the linear array together with an extra ground plane is used to achieve improved array performance with high main lobe gain and reduced side lobe.

9 Claims, 7 Drawing Sheets

WIDEBAND MICROSTRIP ANTENNA ARRAY BASED ANTENNA SYSTEM FOR GHz COMMUNICATIONS

RELATED APPLICATIONS

This application claims priority to Indian Application No. 202231026020, Filing Date May 4, 2022, which is hereby incorporated herein by reference in its entireties.

FIELD OF THE INVENTION

The present invention relates to broadband microstrip antenna array system for millimeter wave applications. More specifically, the present invention is directed to develop a wideband microstrip antenna array based antenna system with wide impedance bandwidth (~3 GHz) and good directive pattern with peak gain ~11.5 dBi. The present antenna system can be integrated with other front-end components to design phased array panel for application in 5G communications.

BACKGROUND OF THE INVENTION

The millimeter wave frequency range is chosen for the future generation communication systems due to the wide available bandwidth. However, the characteristics of millimeter wave communication are different from other existing narrow-band communication systems operating in microwave frequency range (e.g. 2.4 GHz and 5 GHz band). This requires the consideration of blockage due to low diffraction capability, high propagation loss, high atmospheric loss etc. All these characteristics of millimeter wave communications set new design challenges in various areas including the antennas.

The link capacity can be increased by allowing directional communication using beam-forming array antenna [1]. This requires the design of appropriate antenna and antenna array that can be integrated with other circuitry e.g. frontend detector and amplifier circuits.

The commonly used antennas for millimeter-wave communication are leaky-wave antennas, integrated and micro-strip antennas [2]. The micro-strip antennas find wide application due to various attractive features e.g. low profile, light weight, integrability with other components etc [3-4].

The micro-strip patch, yagi antenna etc. are used earlier for millimeter-wave communications [5-14]. However, there are few disadvantages such as narrow impedance bandwidth, low gain, substrate loss etc. In addition at higher frequencies, the electrical thickness of the substrate increases which affects the input impedance and bandwidth of the antenna [4].

For array structures the feed line loss, mutual coupling between array elements highly influence array performance. Thus, the survey of the existing literature shows that though various micro-strip antennas/arrays are used for GHz communications, there is a need for designing appropriate wideband, high gain, compact and low cost antenna array with the performance optimization considering mutual coupling, feeding loss etc at the design phase before fabrication.

REFERENCE

[1] S. Kutty, D. Sen, "*Beamforming for millimeter wave communications: an Inclusive survey,*" *IEEE Communications Surveys & Tutorials* 18(2), 949-973 (2016).

[2] F. K. Schwering, "*Millimeter wave antennas,*" *Proceedings of the IEEE,* 80(1), 92-102 (1992).

[3] M A. Weiss, "*Microstrip antennas for millimeter waves,*" *IEEE Transactions on Antennas and Propagation* 29(1), 171-174 (1981).

[4] D. M Pozar, "*Considerations for millimeter wave printed antennas,*" *IEEE Transactions on Antennas and Propagation*, vol. AP-31, no. 5, pp. 740-747, September 1983.

[5] Z. Briqech, A. Sebak, "*Low cost* 60 *GHz printed yagi antenna array,*" *IEEE International Symposium on Antennas and Propagation Society* (*APSURSI*), Chicago, USA (2012).

[6] Lamminen, A. E., J. Saily, and A. R. Vimpari. "60-*GHz patch antennas and arrays on LTCC with embedded-cavity substrates.*" *IEEE Transactions on Antennas and Propagation* 56.9 (2008): 2865-2874.

[7] B. Biglarbegian, M Fakharzadeh, D. Busuioc, et al., "*Optimized microstrip antenna arrays for emerging millimeter-wave wireless applications,*" *IEEE Transactions on antennas and propagation*, vol. 59, no. 5, pp. 1742-1747, 2011.

[8] Li, Mingjian, and Kwai-Man Luk. "*Low-cost wideband microstrip antenna array for* 60-*GHz applications.*" *IEEE Transactions on Antennas and propagation* 62.6 (2014): 3012-3018.

[9] Pazin, Lev, and Yehuda Leviatan. "*A compact* 60-*GHz tapered slot antenna printed on LCP substrate for WPAN applications.*" *IEEE Antennas and Wireless Propagation Letters* 9 (2010): 272-275.

[10] Y. Li and K. M Luk, "*Low-cost high-gain and broadband substrate-integrated-waveguide-fed patch antenna array for* 60-*GHz band,*" *IEEE Transactions on Antennas and Propagation*, vol. 62, no. 11, pp. 5531-5538, November 2014.

[11]M. Alam, M T Islam, N. Misran, and J. Mandeep, "*A wideband microstrip patch antenna for* 60 *GHz wireless applications,*" *Elektronika it Elektrotechnika*, vol. 19, no. 9, pp. 65-70, 2013.

[12] S. Ghosh and D. Sen, "*Design of millimeter-wave microstrip antenna array for 5g communications-a comparative study,*" *in International Conference on Intelligent Systems Design and Applications*. Springer, 2017, pp. 952-960.

[13] Deo, Prafulla, et al. "*Liquid crystal based patch antenna array for* 60 *GHz applications*" 2013 *IEEE Radio and Wireless Symposium. IEEE,* 2013.

[14] Saswati Ghosh, Debarati Sen, "*An Inclusive Survey on Array Antenna Design for Millimeter-Wave Communications,*" *IEEE Access Vol.* 7, 2019, pp. 83137-83161.

OBJECT OF THE INVENTION

It is thus the basic object of the present invention is to develop an improved micro-strip antenna array based system for millimeter wave applications and GHz communications.

Another object of the present invention is to develop a micro-strip antenna array based system which would be compact in size, low cost and exhibit wide bandwidth and high gain.

A still further object of the present invention is to develop a wideband microstrip antenna array based system with wide impedance bandwidth (~3 GHz) and good directive pattern with peak gain ~11.5 dBi.

Yet another object of the present invention is to develop a wideband microstrip antenna array based system which can be integrated with front-end components to design phased array panel for application in 5G communications.

SUMMARY OF THE INVENTION

Thus according to the basic aspect of the present invention there is provided a wideband microstrip antenna array based antenna system comprising

- a dielectric substrate; and
- one or more patch antennas, each including at least one U shaped slot;
- said patch antennas are arranged spaced apart from each other in one or more linear arrays on upper surface of said substrate involving close proximal disposition of said slots to operate as resonators and move higher and lower end resonance frequencies of the antenna array system.

In a preferred embodiment of the present wideband microstrip antenna array based antenna system, the patch antennas are placed in the linear array at a distance of λ/2 (wavelength/2) from each other to achieve desired scan performance, where X is the wavelength according to operating frequency.

In a preferred embodiment of the present wideband microstrip antenna array based antenna system, the U shaped slot includes with unequal arms to increase impedance bandwidth of narrow band patch antennas.

In a preferred embodiment of the present wideband microstrip antenna array based antenna system, the substrate includes multilayered dielectric structure

- a top and a lower RT duroid 5880 material layers with relative permittivity of 2.2; and
- a first and a second roha cell (dielectric material with relative permittivity of 1) layers; wherein the first roha cell layer is inserted between the RT duroid layers to increase effective height of the substrate.

In a preferred embodiment of the present wideband microstrip antenna array based antenna system, the patch antennas with U shaped slots are provided on upper surface of the top RT duroid 5880 layer substrate.

In a preferred embodiment, the present wideband microstrip antenna array based antenna system includes microstrip corporate feed network with T-junction power divider on upper surface of the lower substrate layer whereby the patch elements are fed by electromagnetic coupling with the feed network.

In a preferred embodiment, the present wideband microstrip antenna array based antenna system includes a ground conducting layer on lower surface of the lower dielectric material to increase main lobe radiation, having the second roha cell layer there between.

In a preferred embodiment, the present wideband microstrip antenna array based antenna system includes dummy elements on both sides of each U shaped slot to reduce side lobe.

In a preferred embodiment of the present wideband microstrip antenna array based antenna system, the dummy elements are identical with the microstrip patch antenna elements and placed at a distance of λ/2 from the end elements of the array on the upper surface of the RT duroid substrate to decrease difference in array edge and central element coupling environment and thereby mitigate performance degradation of the array due to mutual coupling effect and reduce the side lobe level of the array radiation pattern.

In a preferred embodiment, the present wideband microstrip antenna array based antenna system includes extra ground plane to improved array performance with high main lobe gain and reduced side lobe in combination with the dummy elements.

BRIEF DESCRIPTION OF THE ACCOMPANYING DRAWING

Figure 1:
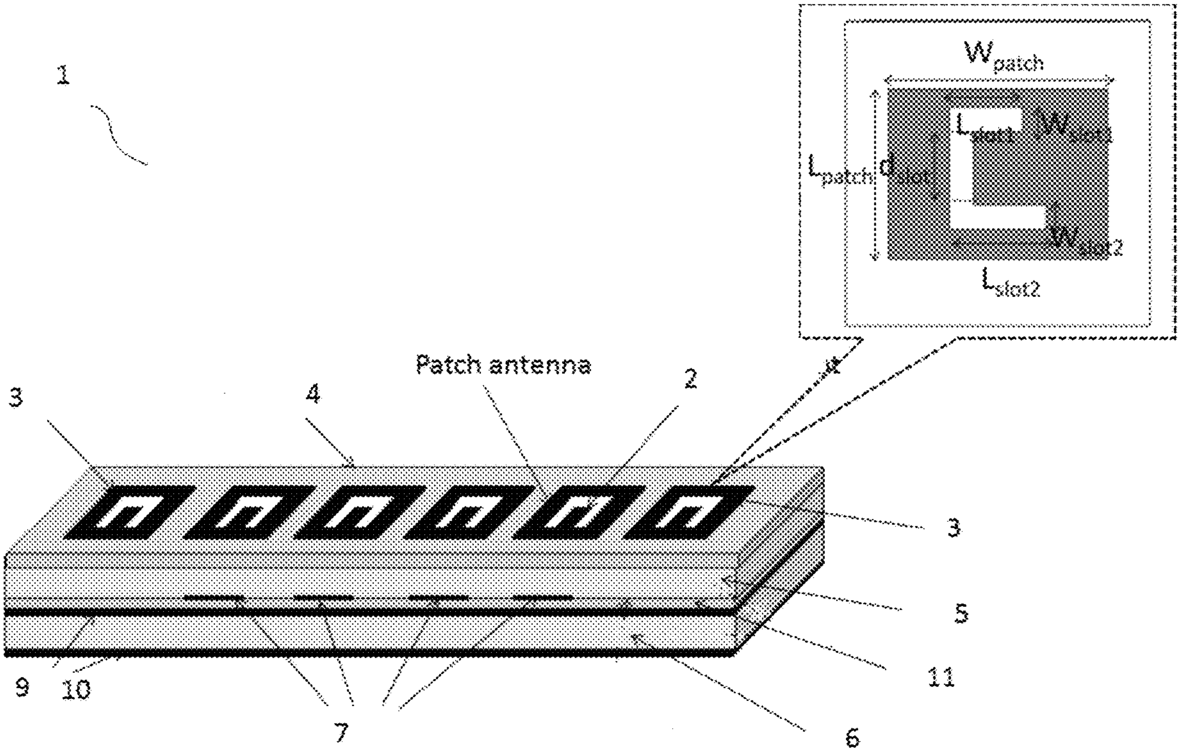
FIG. 1 shows 1×4 array of electromagnetically coupled microstrip patch antenna with U shaped slot with dummy elements and extra ground plane in accordance with an embodiment of the present invention.

DETAILED DESCRIPTION OF THE INVENTION WITH REFERENCE TO THE ACCOMPANYING DRAWINGS

The present invention discloses a wideband microstrip antenna array based antenna system (1) for millimeter wave applications. As shown in the FIG. 1, the microstrip antenna array system (1) of the present invention includes plurality of patch antennas and each of the patch antennas includes a U-slot of unequal arms (2). This patch antenna with the U-slot acts as the array element. In present array embodiment, the array elements are placed in a linear array at a distance of λ/2 from each other to achieve desired scan performance.

The whole array system (1) includes a multilayer dielectric materials based substrate structure to extend the impedance bandwidth. The substrate structure is consisting of RT duroid 5880 dielectric material layers (4, 11) with relative permittivity of 2.2 and thickness of d1 and d3 respectively and roha cell dielectric layers (5, 6) with relative permittivity of 1 and thickness of d2 and d4 respectively. The microstrip patch antenna elements with U-shaped slots (2) are printed on upper surface of the top RT duroid 5880 layer substrate (4).

The U-slot (2) with unequal arms is used to increase the impedance bandwidth of the narrow band patch antennas. The mutual coupling between the compactly coupled arms of U-slots behaves as resonators. The different arm lengths of the U-slot produce two closely staggered resonant modes which widen the impedance bandwidth of the antenna.

The antenna elements in the array are replicated side by side. As shown in FIG. 1, the elements are arranged symmetrically with same orientation such that the longer arm of the U-slot of one element faces the shorter arm of the U-slot of next element. Also the opening of the U-slot should be in the same direction for all the elements in the array. Thus though the whole array arrangement can be reversed, the orientation of individual element separately in the array CAN NOT be reversed. The change in orientation of individual element in the array will disturb the uniformity of the array which will affect the mutual coupling and hence the overall performance of the array.

To increase the effective height of the substrate, a first roha cell layer (5) is inserted between the RT duroid layers (4, 11). The microstrip corporate feed network (7) with T-junction power divider (8) is printed on the upper surface of the lower RT duroid substrate layer (6). The antenna elements are fed by electromagnetic coupling with the feed network (7). The coaxial probe feed is avoided to avoid high feed loss at millimeter wave frequencies. The ground conducting layer is printed on the lower surface of the lower dielectric material.

Figure 2:
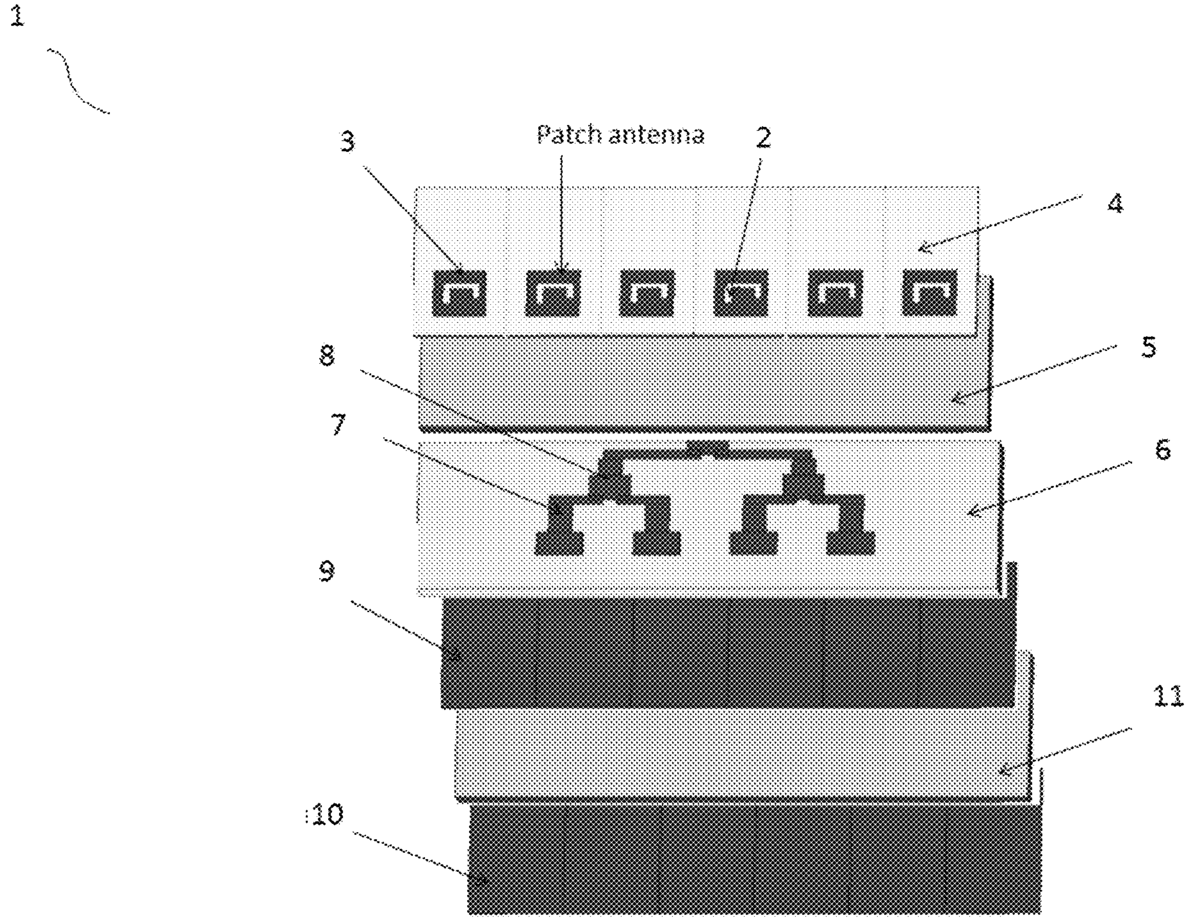
FIG. 2 shows layer wise diagram of linear array of electromagnetically coupled microstrip patch antenna with U-shaped slot with dummy elements and extra ground plane in accordance with an embodiment of the present invention.

In a preferred embodiment, to improve the array performance, dummy elements (3) are considered on both sides of the array to reduce the side lobe. Also to increase main lobe radiation, another conducting plane (9) is considered below the antenna structure. The antenna array with dummy elements (3) on both sides of the linear array together with extra ground plane (10) is selected due to improved array performance with high main lobe gain and reduced side lobe. The layer-wise diagram of the whole array module is shown in FIG. 2.

The dummy elements are identical with the array element of microstrip patch antenna with U-slot. The dummy elements are placed at a distance of λ/2 from the end elements of the array on the upper surface of the RT duroid substrate. However they are NOT excited by electromagnetically coupled microstrip feed line.

The mutual coupling environment of central and edge elements of an array differ substantially from each other due to the difference in the number of elements on both sides of the element. The use of dummy elements on both sides of the array decreases the difference in array edge and central element coupling environment. Thus the dummy elements mitigate the performance degradation of the array due to mutual coupling effect and reduce the side lobe level of the array radiation pattern.

As a case study, the present antenna array structure has been studied for 60 GHz millimeter-wave frequency. The description of the parameters with approximate values is presented in Table 1. However the present concepts are in no way limited to the dimensions discussed.

TABLE 1

Description of the parameters used in FIG. 2 for 60 GHz as a case study

| Parameter | Description | Values (mm) |
|---|---|---|
| $L_{patch}$ | Patch length | 1.40 |
| $W_{patch}$ | Patch width | 1.20 |
| $L_{slot1}$ | Length of slot 1 | 0.50 |
| $L_{slot2}$ | Length of slot 2 | 0.80 |
| $W_{slot1}$ | Width of slot 1 | 0.20 |

TABLE 1-continued

Description of the parameters used in FIG. 2 for 60 GHz as a case study

| Parameter | Description | Values (mm) |
|---|---|---|
| $W_{slot2}$ | Width of slot 2 | 0.20 |
| $d_{slot}$ | Distance between two slots | 0.60 |
| d1 | Height of layer 1 (RT duroid 5880) | 0.381 |
| d2 | Height of layer 2 (Roha cell) | 1.12 |
| d3 | Height of layer 3 (RT duroid 5880) | 0.381 |
| d4 | Height of layer4 (Roha cell) | 1.5 |
| Tg | Thickness of ground layer | 0.035 |

Figure 3:
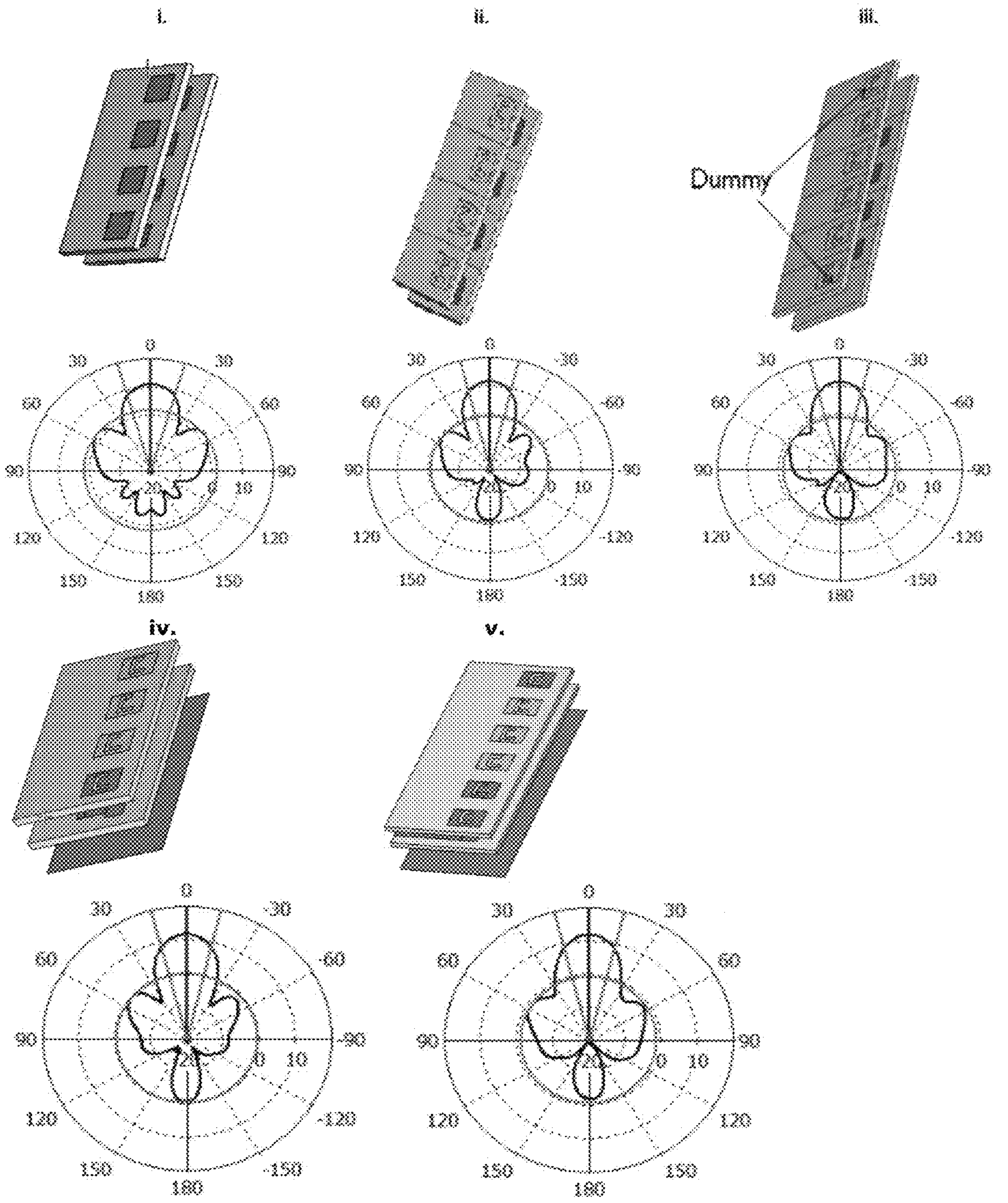
FIG. 3 shows performance comparison of various array configurations in terms of broadside radiation pattern at 60 GHz.
Figure 4:
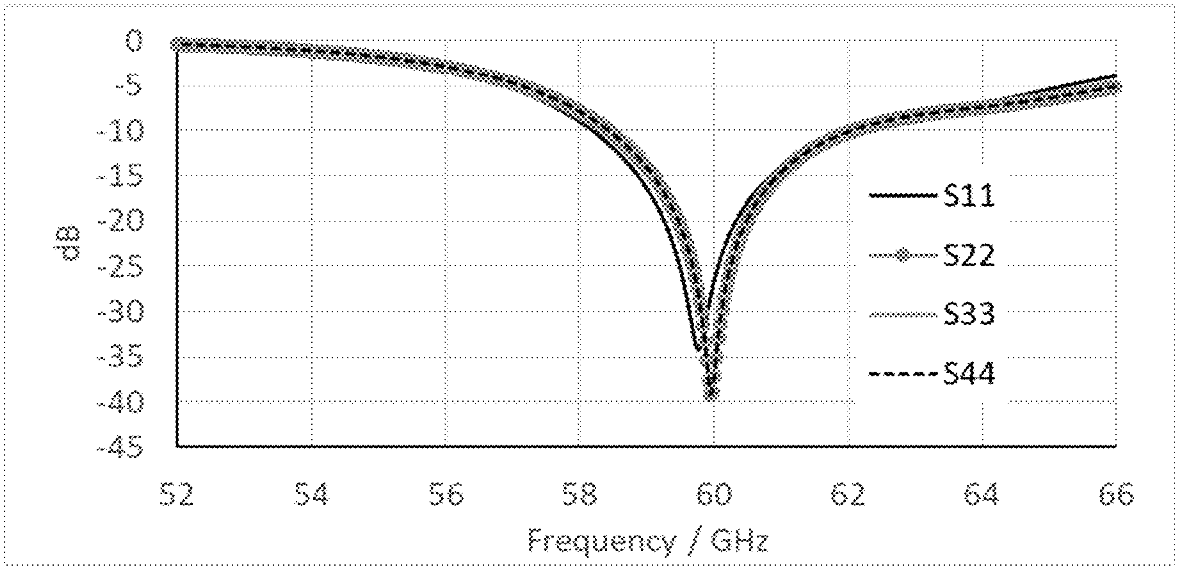
FIG. 4 shows plot of $S_{11}$ versus frequency of the four element linear array with dummy elements and extra ground plane.
Figure 5A:
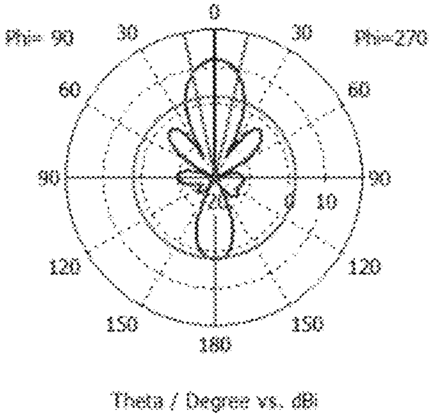
FIGS. 5A-5D shows far-field radiation pattern versus theta in degree on phi=90° plane of the proposed four element linear array with dummy elements and extra ground plane with main-beam directions (a) $\theta_0=0°$; (b) $\theta_0=-14°$; (c) $\theta_0=-23°$; (d) $\theta_0=-31°$.
Figure 5B:
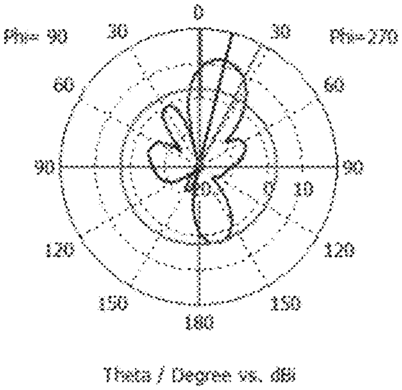
Figure 5C:
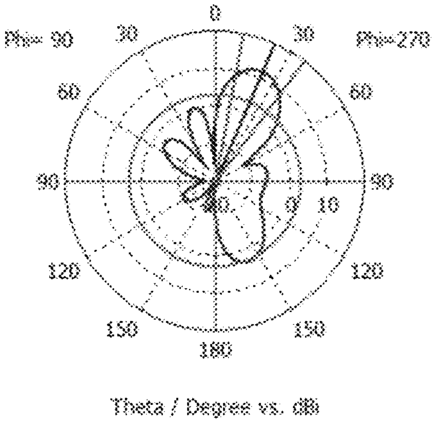
Figure 5D:
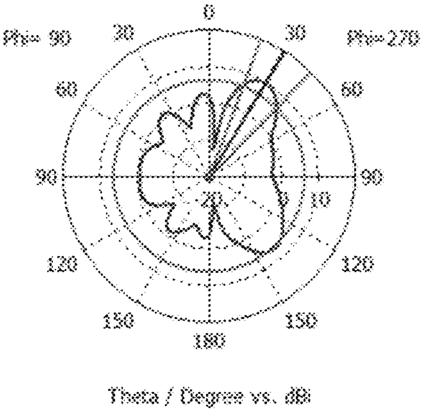

A comparative study of the array pattern of different array configurations is presented in FIG. 3. The results show that the patch antenna array with the U slot and dummy element and extra ground plane shows the best main lobe gain with the lowest side-lobe level compared to the other array configurations (Table 2).

Figure 6:
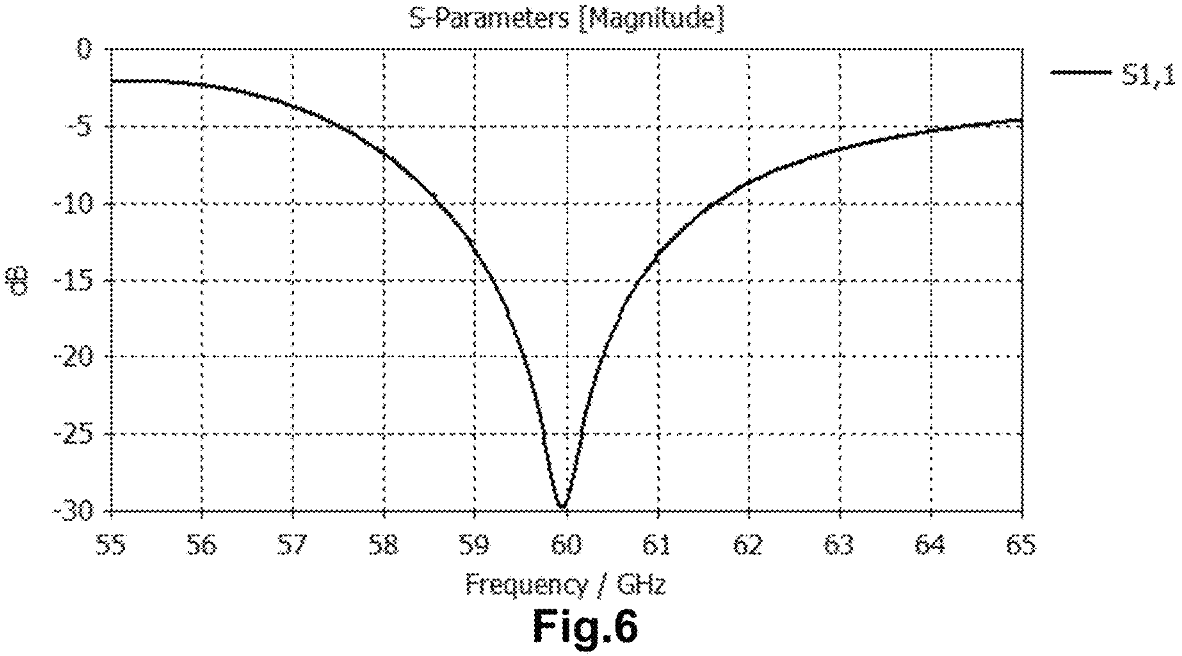
FIG. 6 shows plot of Su versus frequency of the proposed antenna array module with corporate feed network with dummy elements and extra ground plane.
Figure 7:
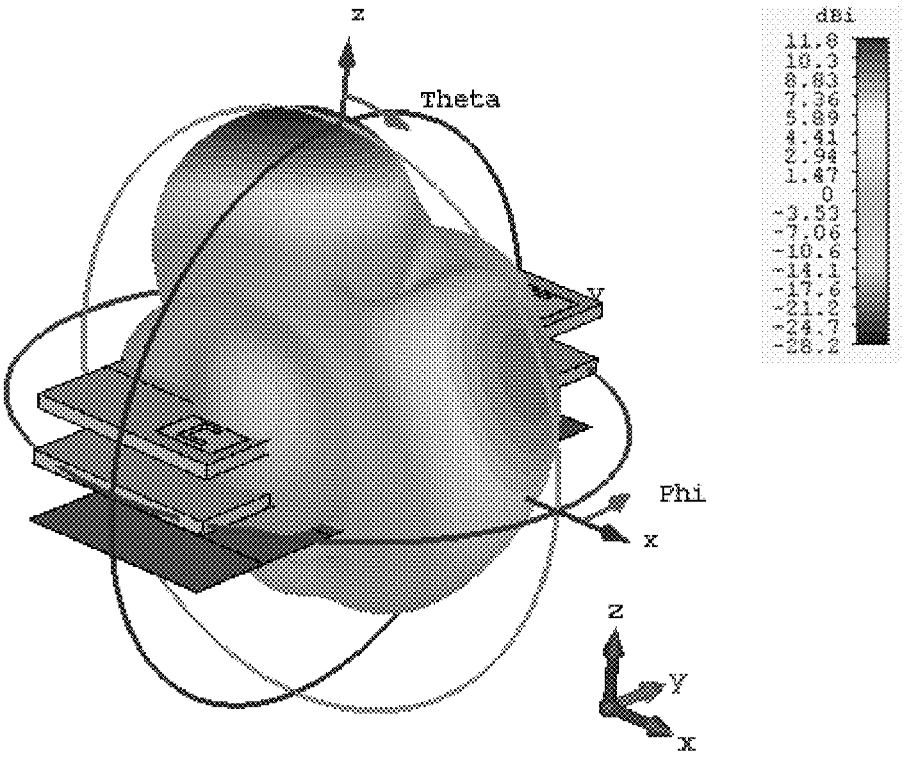
FIG. 7 shows 3-D radiation pattern at 60 GHz of the proposed antenna array module with corporate feed network with dummy elements and extra ground plane.
Figure 8:
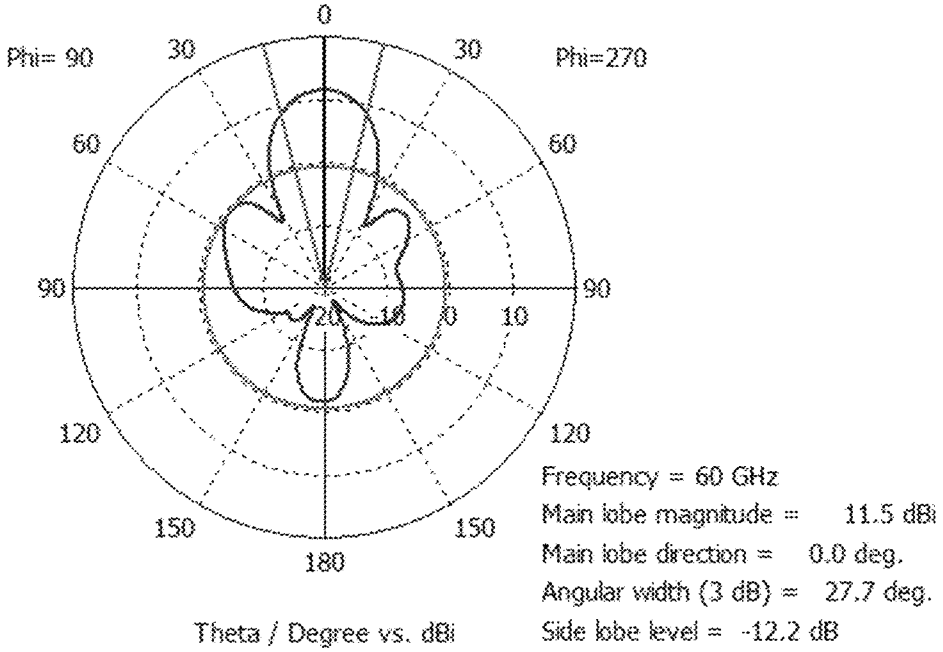
FIG. 8 shows far-field radiation pattern versus theta in degree on phi=90° of the proposed antenna array module with corporate feed network with dummy elements and extra ground plane.

The simulated results for return loss, radiation pattern of the four element linear array with dummy elements and extra ground plane are presented in FIGS. 4 and 5A-5D. The plot of $S_{11}$ versus frequency of the antenna shows 10 dB return loss bandwidth over 58.5-61.5 GHz. The antenna shows peak gain ~11.9 dBi at 60 GHz. Next the whole array structure with corporate feed and power divider is simulated and optimized considering the coupling between the feed structure and antenna array including the dummy elements and extra ground plane. The results for return loss and radiation pattern are shown in FIGS. 6-8. The fabrication of the prototype array antenna is underway to verify and compare the simulated results with experimental data.

TABLE 2

Performance comparison of various array configurations in terms of broadside radiation pattern at 60 GHz

| Parameters | 1X4 Array (without slot) | 1X4 Array (with U-slot) | 1X4 Array (with U-slot) plus dummy | 1X4 Array (with U-slot) plus extra ground | 1X4 Array (with U-slot) plus dummy plus extra ground |
|---|---|---|---|---|---|
| Main lobe Magnitude (dBi) | 9.8 | 11.3 | 11.3 | 11.4 | 11.8 |
| Angular Width (3 dB) | 30.1° | 27.5° | 28.1° | 27.7° | 27.7° |
| Side lobe Level (dB) | −12.9 | −11.1 | −12.0 | −11.6 | −12.2 |

Figure 9:
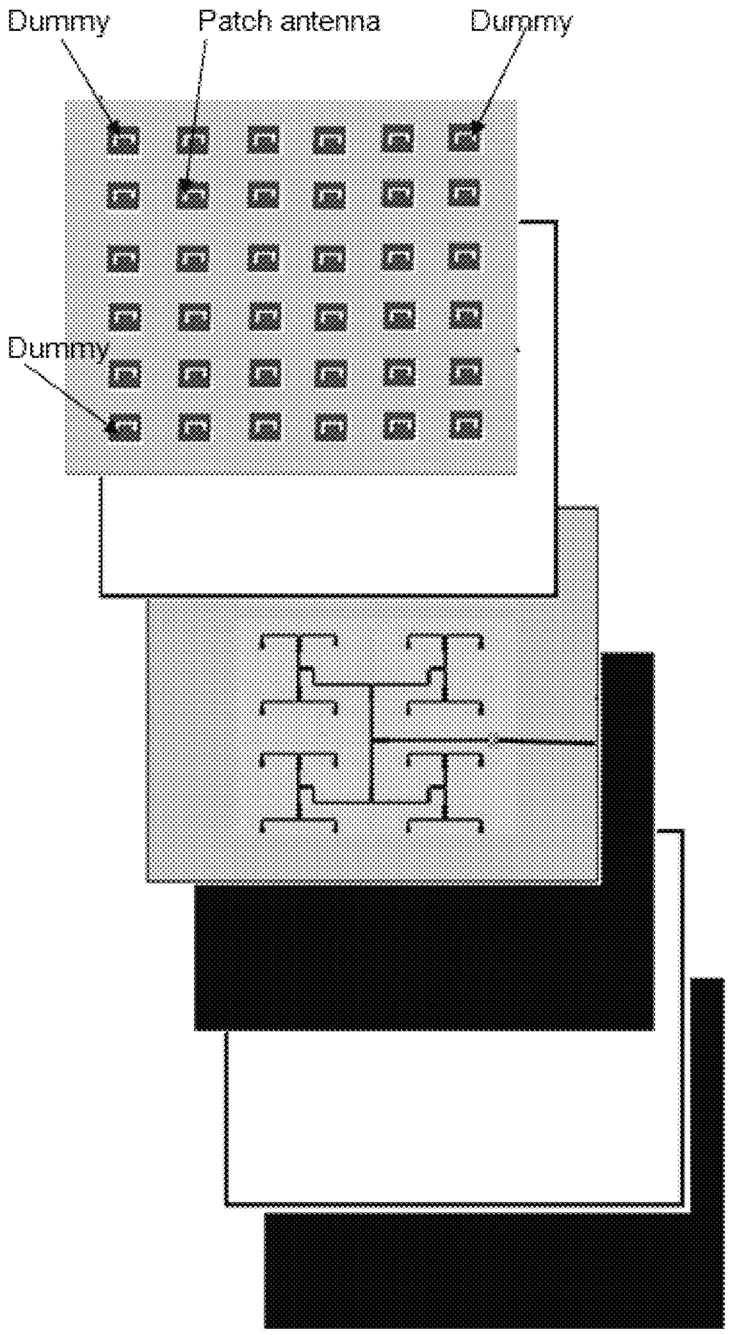
FIG. 9 shows layer wise diagram of rectangular array of electromagnetically coupled microstrip patch antenna with U-shaped slot with dummy elements and extra ground plane.

Though the invention embodiment shows linear array of patch antennas with U-slot, the present antenna system may include multiple array of the patch antennas. The schematic illustration of a rectangular array including dummy elements on both sides and extra ground plane is shown in FIG. 9.

The advantages of the present antenna system can be summarized as hereunder:

Achievement of wide impedance bandwidth (~3 GHz) by using multilayer structured microstrip patch with U-slot antenna as array element Reduced feed loss using proximity coupled feed technique suitable for millimeter wave applications Reduced coupling of the radiation of feed network with actual array radiation due to the presence of the substrate layer over the feed network Though the array structure is multilayer consisting of four layers including RT duroid and roha cell, it can be fabricated by stacking conventional low cost single printed circuit boards The array gain is increased by using dummy element on both sides of the array and an extra ground plane Good directive pattern with peak gain ~11.5 dBi is achieved The antenna array is designed as a whole including suitable feeding mechanism to estimate the performance of the array accurately before fabrication of the prototype The antenna array can be integrated with other front-end components to design the phased array panel for the application in 5G communications.

We claim:

1. A wideband microstrip antenna array based antenna system comprising:

a dielectric substrate of four dielectric layers;

multiple microstrip patch antennas, wherein each of the microstrip patch antennas includes at least one U shaped slot, and the microstrip patch antennas are arranged spaced apart from each other in a linear array on top of said dielectric substrate involving close proximal disposition of said U shaped slots to operate as resonators and move higher and lower end resonance frequencies of the antenna array system;

a microstrip feed network within the dielectric substrate for feeding the microstrip patch antennas with U shaped slots by electromagnetic coupling;

dummy elements which are identical with the microstrip patch antenna on both ends of the linear array, said dummy elements are non-excitable by the microstrip feed network to reduce side lobe; and two conducting ground planes to improve array performance with high main lobe gain.

2. The wideband microstrip antenna array based antenna system as claimed in claim 1, wherein the microstrip patch antennas are placed in the linear array at a distance of λ/2 from each other to achieve desired scan performance, where λ is the wavelength according to operating frequency.

3. The wideband microstrip antenna array based antenna system as claimed in claim 1, wherein the U shaped slot includes unequal arms to increase impedance bandwidth of narrow band patch antennas.

4. The wideband microstrip antenna array based antenna system as claimed in claim 1, wherein the four dielectric layers of the dielectic substrate are vertically stacked and includes a top dielectric layer and a dielectric lower layer of a dielectric material with relative permittivity of 2.2; and a first dielectric layer and a second dielectric layer of a dielectric material with relative permittivity of 1;

wherein the first dielectric layer is inserted between the top and the lower dielectric layers to increase effective height of the substrate.

5. The wideband microstrip antenna array based antenna system as claimed in claim 1, wherein the microstrip patch antennas with the U shaped slots are provided on upper surface of the top dielectric layer.

6. The wideband microstrip antenna array based antenna system as claimed in claim 1, wherein the microstrip feed network with a T-junction power divider is placed on upper surface of the lower dielectric layer for electromagnetic coupling with the U shaped slots.

7. The wideband microstrip antenna array based antenna system as claimed in claim 1, wherein the second dielectric layer is provided between the ground conducting planes.

8. The wideband microstrip antenna array based antenna system as claimed in claim 1, wherein the dummy elements and placed at a distance of λ/2 from end microstrip patch antenna of the array on the upper surface of the top dielectric layer to decrease difference in array edge and central element coupling environment and thereby mitigate performance degradation of the array due to mutual coupling effect and reduce the side lobe level of the array radiation pattern.

9. The wideband microstrip antenna array based antenna system as claimed in claim 1, includes an extra ground plane to improve array performance with high main lobe gain and reduced side lobe in combination with the dummy elements.

* * * * *